US010725703B2

(12) United States Patent
Yamauchi

(10) Patent No.: US 10,725,703 B2
(45) Date of Patent: Jul. 28, 2020

(54) METHOD FOR WRITING DATA, MEMORY DEVICE AND DATA WRITING SYSTEM

(71) Applicant: LAPIS Semiconductor Co., Ltd., Yokohama (JP)

(72) Inventor: Saku Yamauchi, Yokohama (JP)

(73) Assignee: LAPIS SEMICONDUCTOR CO., LTD., Yokohama (JP)

(*) Notice: Subject to any disclaimer, the term of this patent is extended or adjusted under 35 U.S.C. 154(b) by 57 days.

(21) Appl. No.: 16/202,279

(22) Filed: Nov. 28, 2018

(65) Prior Publication Data
US 2019/0163402 A1 May 30, 2019

(30) Foreign Application Priority Data

Nov. 29, 2017 (JP) ................. 2017-229044

(51) Int. Cl.
G06F 12/00 (2006.01)
G06F 3/06 (2006.01)

(52) U.S. Cl.
CPC .......... G06F 3/0659 (2013.01); G06F 3/0604 (2013.01); G06F 3/0679 (2013.01)

(58) Field of Classification Search
None
See application file for complete search history.

(56) References Cited

U.S. PATENT DOCUMENTS

2012/0221767 A1* 8/2012 Post .................... G06F 13/1673
711/103

FOREIGN PATENT DOCUMENTS

JP 2007-164865 A 6/2007

* cited by examiner

Primary Examiner — Jason W Blust
(74) Attorney, Agent, or Firm — Rabin & Berdo, P.C.

(57) ABSTRACT

A method for writing data includes: data maintaining step for maintaining writing object data to each of a plurality of memory devices; obtaining step for obtaining identification information assigned to each of the plurality of memory devices; generating step for generating combination data by associating and combining the identification information and the writing object data with respect to the plurality of memory devices; and sending step for sending the combination data to the plurality of memory devices; which are performed by a writing device. The method also includes receiving step for receiving the combination data; extracting step for extracting the writing object data corresponding to the memory device on the basis of the identification information from the combination data; and memorizing step for memorizing the target data for writing extracted from the combination data; which are performed by each of the plurality of memory devices.

6 Claims, 10 Drawing Sheets

METHOD FOR WRITING DATA, MEMORY DEVICE AND DATA WRITING SYSTEM

BACKGROUND

1. Technical Field

The present invention relates to a method for writing data to a memory device.

2. Description of the Related Art

A writing process is performed with respect to a semiconductor memory device after assembly of the device and before shipment. In that process, data which is specific to the device (hereinafter referred to as "unique data") is written. For example, in a manufacturing process of a semiconductor memory device, a process for writing trimming data is performed in order to adjust dispersion in manufacturing. At that time, in case a plurality of semiconductor devices are the targets of the writing, each of the devices is written with unique data different per device.

A semiconductor memory device providing means for calculating trimming value internally in each semiconductor device is suggested so as to avoid complicated process flows and errors raised in the writing of the trimming data to the plurality of semiconductor memory devices. (for example, Japanese Patent Application Laid-Open No. 2007-164865).

When the unique data which is target of writing cannot be generated internally in each semiconductor memory device, data have to be written in each semiconductor memory device in serial by a writing device such as writer. For example, the writing device performs writing the unique data into a plurality of semiconductor devices by repeating a set of operation times as much as a number of the semiconductor memory devices. The set of operation includes reading-out the unique data from its database and writing the unique data into corresponding semiconductor memory device.

SUMMARY

In the serial writing of the unique data mentioned above, writing operation is performed to each of the semiconductor memory devices one by one in sequence so that process time is required. Length of the process time is proportional to the number of the semiconductor memory devices. In writing of the unique data, each semiconductor memory device which is target of the writing is required to be powered on, thereby length of time required to activate the semiconductor memory device increases in proportion to the number of the semiconductor memory devices.

It is therefore an object of the present invention is to provide a method for writing data which is capable of writing unique data into a plurality of memory devices within a short process time.

A method for writing data according to the present invention is performed by a data writing system constituted by a plurality of memory devices and a writing device which writes data into the plurality of memory devices. The method includes: data maintaining step at the writing device, for maintaining writing object data to each of the plurality of memory devices; obtaining step at the writing device, for obtaining identification information assigned to each of the plurality of memory devices from the plurality of memory devices; generating step at the writing device, for generating combination data by associating and combining the identification information and the writing object data with respect to the plurality of memory devices; sending step at the writing device, for sending the combination data to the plurality of memory devices; receiving step at each of the plurality of memory devices, for receiving the combination data; extracting step at each of the plurality of memory devices, for extracting the writing object data corresponding to the memory device on the basis of the identification information from the combination data; and memorizing step at each of the plurality of memory devices, for memorizing the target data for writing extracted from the combination data.

A memory device according to the present invention is a memory device which memorizes data comprising: a nonvolatile memory; a writing circuit configured to write data in the nonvolatile memory; a buffer configured to store the writing object data temporarily; a receiving part configured to receive a combination data which is obtained by associating and combining identification information with respect to a plurality of memory devices and writing object data, and a writing signal which indicates writing of data into the nonvolatile memory; and a comparing part configured to compare the identification information memorized in an identification information memorizing part and identification information with respect to the plurality of memory devices included in the combination data; wherein the comparing part extracts writing object data corresponding to the memory device from the combination data on the basis of a result of the comparison, the buffer stores temporarily the writing object data extracted by the comparing part, the writing circuit writes the writing object data which is read out from the buffer into the nonvolatile memory in response to the writing signal.

According to the method for writing data of the present invention, it becomes possible to perform writing of unique data into a plurality of memory devices within a short process time.

DETAILED DESCRIPTION

Figure 1:
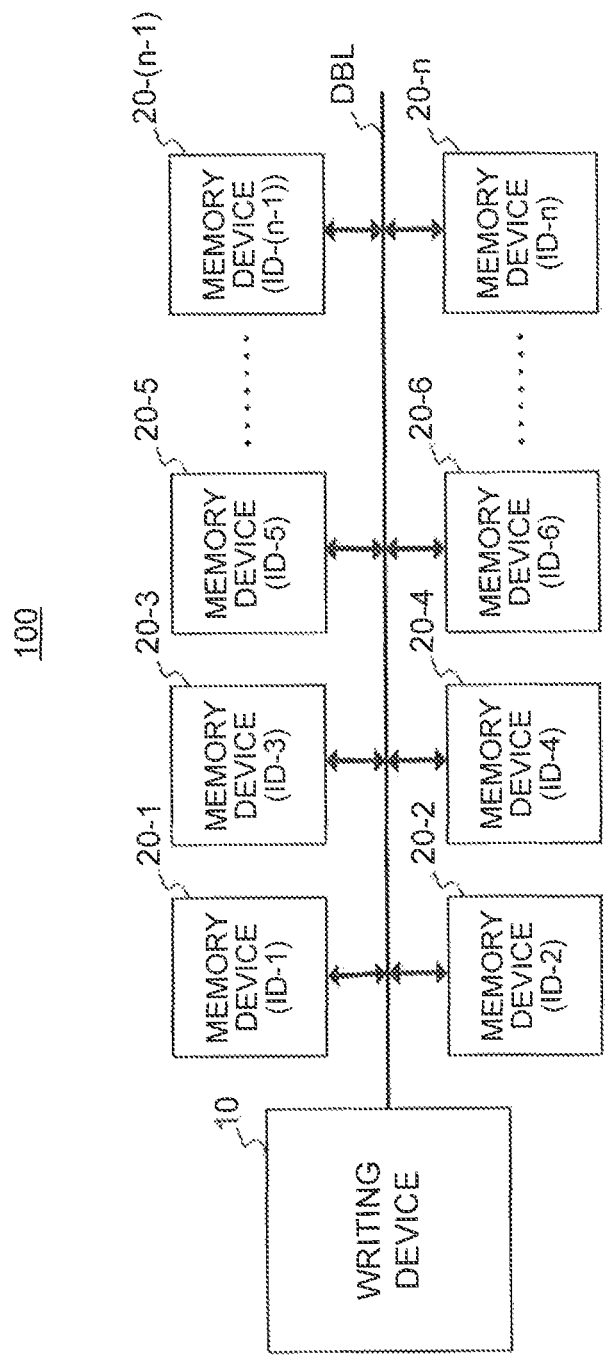
FIG. 1 is a block diagram showing a configuration of a data writing system of a first embodiment.

An embodiment of the present invention will now be described below in detail with reference to the drawings. In explanation or drawings of the following each embodiments, same reference numerals refer to substantially identical or equivalent elements.

First Embodiment

FIG. 1 is a block diagram showing a configuration of a data writing system of the present embodiment. A data writing system 100 in the present embodiment is constituted by a writing device 10 and a plurality of memory devices 20-1 to 20-$n$ (n: integer number greater than or equal to 2). The writing device 10 and the memory devices 20-1 to 20-$n$ are connected to each other through data bus line DBL.

A unique ID is assigned to each of the memory devices 20-1 to 20-$n$ as an identification information for identifying each devices. For example, ID-1 is assigned to the memory device 20-1, ID-2 is assigned to the memory device 20-2, ID-3 is assigned to the memory device 20-3, ID-4 is assigned to the memory device 20-4, ID-5 is assigned to the memory device 20-5, ID-6 is assigned to the memory device 20-6, ID-(n–1) is assigned to the memory device 20-(n–1), and ID-n is assigned to the memory device 20-$n$.

Figure 2:
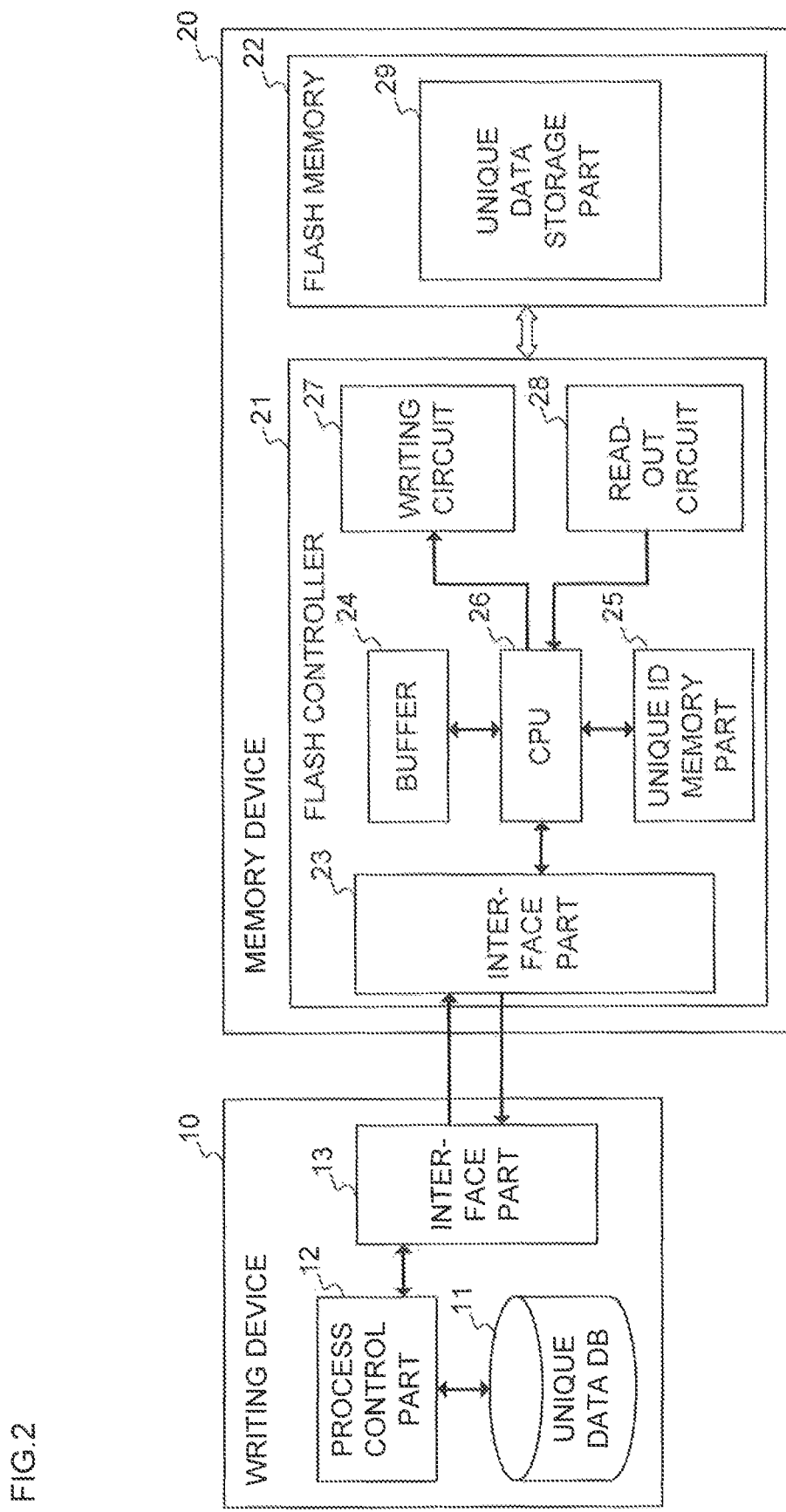
FIG. 2 is a block diagram showing a configuration of a writing device and a memory device of the first embodiment.

FIG. 2 is a block diagram showing a configuration of the writing device 10 and one of the memory devices 20-1 to 20-$n$ (hereinafter referred to as memory device 20).

For example, the writing device 10 is a writer which writes data into a semiconductor memory device. The writing device 10 comprises a unique data DB (database) 11, a process control part 12 and an interface part 13.

Figure 3A:
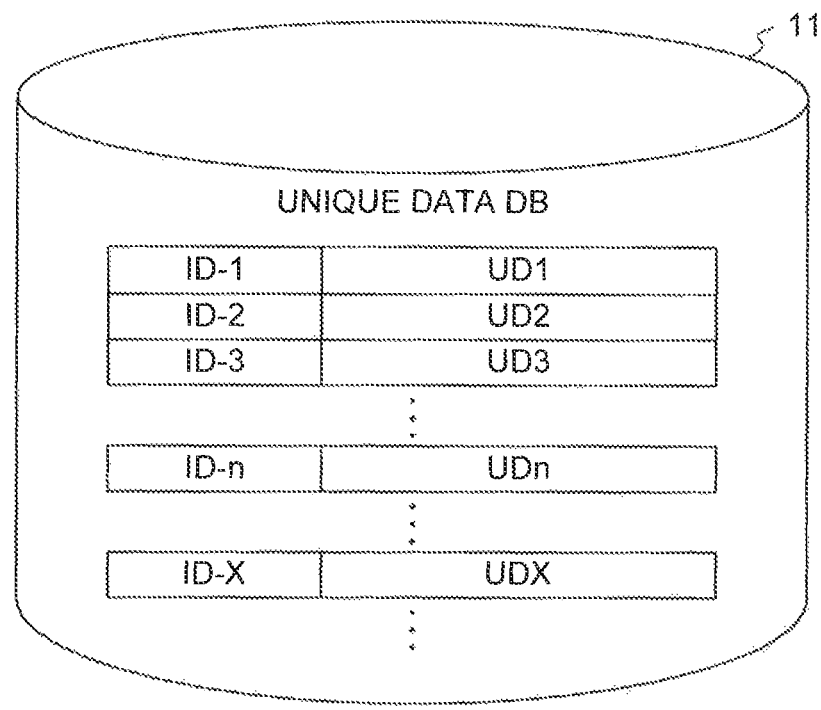
FIG. 3A is a schematic diagram showing an example of data stored in a unique data DB.

FIG. 3A is a schematic diagram showing an example of data stored in the unique data DB 11. Unique data UD1 to UDn corresponding to the respective memory devices 20-1 to 20-$n$ are stored in the unique data DB 11 in association with ID-1 to ID-n which are unique IDs of respective memory devices. The unique data UD1 to UDn become target of writing into the memory devices 20-1 to 20-$n$ in a data writing process performed by the data writing system 100 of the present embodiment.

Unique data (e.g. UDX) of a memory device other than the memory devices 20-1 to 20-$n$ (e.g. a memory device performs data writing at a different moment from the memory devices 20-1 to 20-$n$) is stored in the unique data DB 11 in associated with unique ID (e.g. ID-X) of the other memory device.

Referring to FIG. 2 again, the process control part 12 performs various data processing and controls each block of the writing device 10 in the data writing process of the present embodiment. Specifically, the process control part 12 reads out unique data from the unique data DB 11 based on unique ID which is received by the interface part 13 from the memory devices 20-1 to 20-$n$. The process control part 12 reads out unique data corresponding to that unique ID.

The process control part 12 generates combination data CD based on the unique data which is read out by the process control part 12. The process control part 12 obtains unique ID of the memory devices 20-1 to 20-$n$ which are target of writing with unique data in the present embodiment. The process control part 12 searches and extracts unique data UD1 to UDn corresponding to the unique ID that the process control part 12 obtains from the unique data DB 11. Then, the process control part 12 generates the combination data CD by combining the unique ID and the unique data.

Figure 3B:
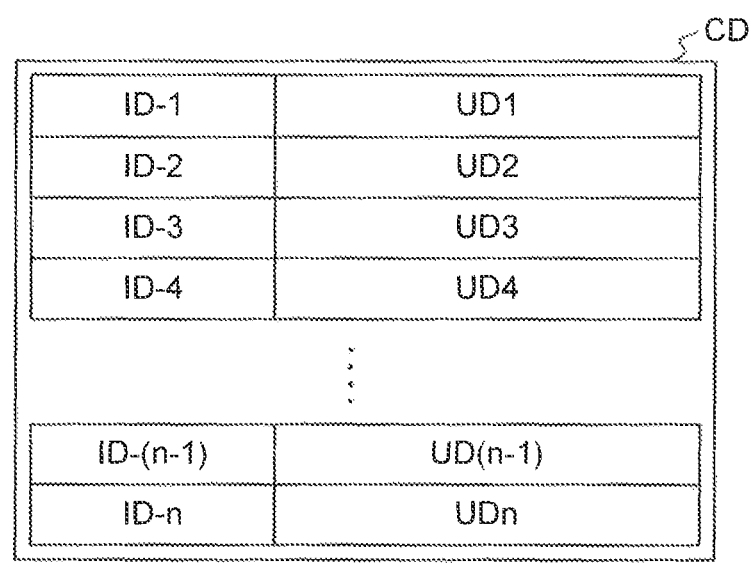
FIG. 3B is a schematic diagram showing contents of a combination data.

FIG. 3B is a schematic diagram showing contents included in the combination data CD. The combination data CD is constituted as one data combining a plurality of unique ID, ID-1 to ID-n, and corresponding unique data UD1 to UDn.

Referring to FIG. 2 again, the process control part 12 generates a parallel writing signal PWS which indicates to write unique data into the memory devices 20-1 to 20-$n$ in parallel.

The interface part 13 receives unique ID from the memory devices 20-1 to 20-$n$ through data bus line DBL. The interface part 13 sends combination data CD and the parallel writing signal PWS to the memory devices 20-1 to 20-$n$ through data bus line DBL.

Figure 4:
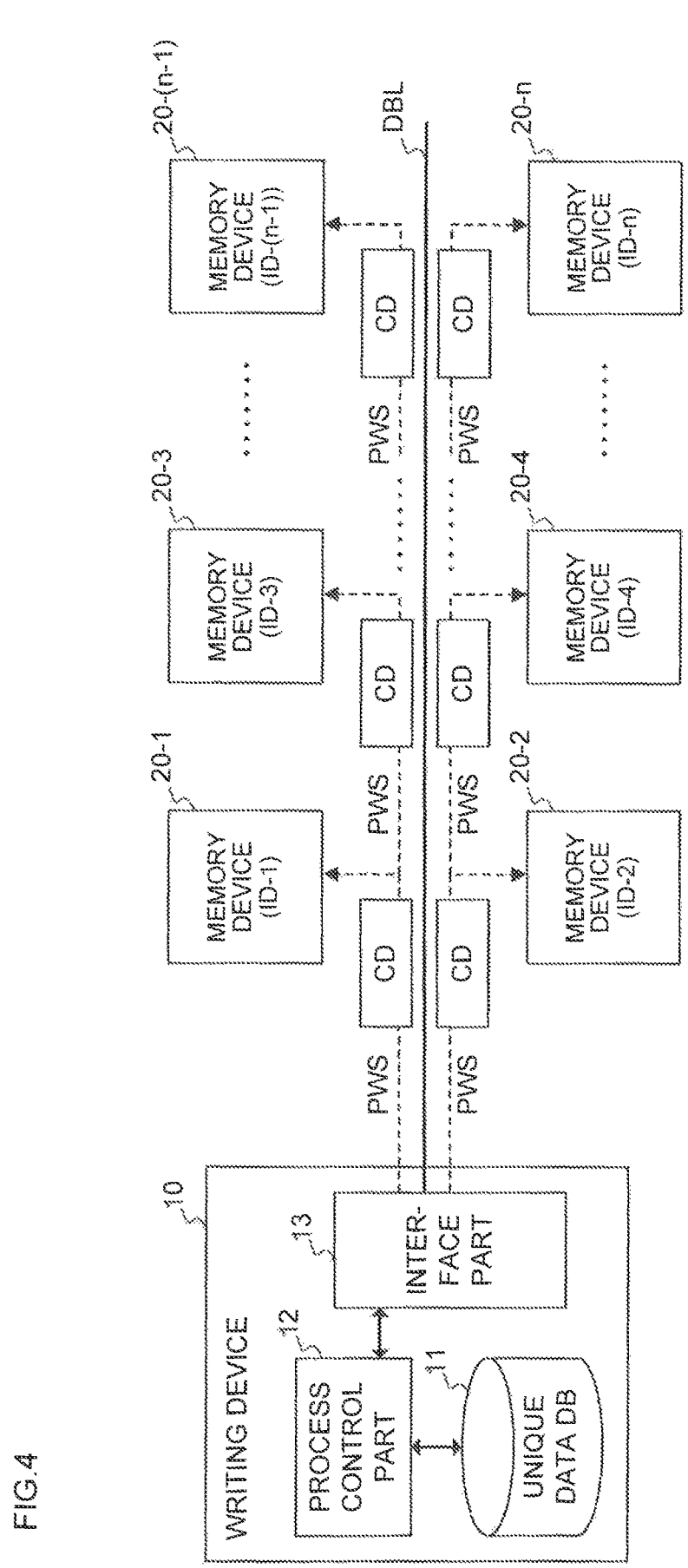
FIG. 4 is a schematic diagram showing transmission of the combination data in the first embodiment.

As shown in FIG. 4, the same combination data CD and the parallel writing signal PWS are supplied to the memory devices 20-1 to 20-$n$ from the writing device 10 through data bus line DBL.

Referring to FIG. 2 again, the memory device 20 comprises a flash controller 21 and a flash memory 22. The flash controller 21 is a control part which controls the flash memory 22 which is a nonvolatile memory device. The flash controller 21 includes an interface part 23, a buffer 24, a unique ID memory part 25, a CPU 26, a writing circuit 27 and a read out circuit 28.

The interface part 23 receives the combination data CD and the parallel writing signal PWS which are sent from the writing device 10 through data bus line DBL. The interface part 23 sends the unique ID memorized in the unique ID memory part 25 to the writing device 10.

The buffer 24 temporarily stores the combination data CD which is received by the interface part 23. The unique ID memory part 25 memorizes the unique ID which is a specific identification information assigned to the memory device 20.

The CPU (Central Processing Unit) 26 controls each block in the flash controller 21. The CPU 26 reads out the unique ID from the unique ID memory part 25 and extracts the unique data corresponding to that unique ID from the combination data CD stored in the buffer 24. The CPU 26 supplies the extracted unique data to the writing circuit 27.

The writing circuit 27 writes data in the flash memory 22 in response to the parallel writing signal PWS which is received by the interface part 23. The read out circuit 28 reads out data from the flash memory 22.

The flash memory 22 includes a unique data storage part 29 which becomes writing destination of writing the unique data by the writing circuit 27.

A process operation of data writing process in the data writing system in the present embodiment is described below referring to a flow chart illustrated in FIG. 5.

First, the interface part 13 in the writing device 10 receives the unique IDs from the memory devices 20-1 to 20-$n$ through the data bus line DBL. The process control part 12 obtains the unique IDs of the memory devices 20-1 to 20-$n$ which is received by the interface part 13 (step S101).

The process control part 12 accesses the unique data DB 11 and searches the unique data corresponding to the unique IDs (i.e. ID-1 to ID-n) which have been obtained in the step S101 (step S102).

The process control part 12 extracts the unique data which has been searched (i.e. UD1 to UDn) from the unique data DB 11 (step S103).

The process control part 12 generates the combination data CD by combining the extracted unique data UD1-UDn and unique IDs, ID-1 to ID-n, corresponding to the unique data (step S104).

The interface part 13 sends the combination data CD in parallel to the memory devices 20-1 to 20-$n$ in response to the control by the process control part 12 (step S105).

The process control part 12 sends the parallel writing signal PWS to the memory devices 20-1 to 20-$n$ through the interface part 13 after completion of sending the combination data CD to all of the memory devices (step S106). The parallel writing signal PWS is indicative of writing the unique data in parallel to the memory devices 20-1 to 20-n.

The memory devices 20-1 to 20-n performs a data storage process (step S107).

Figure 6:
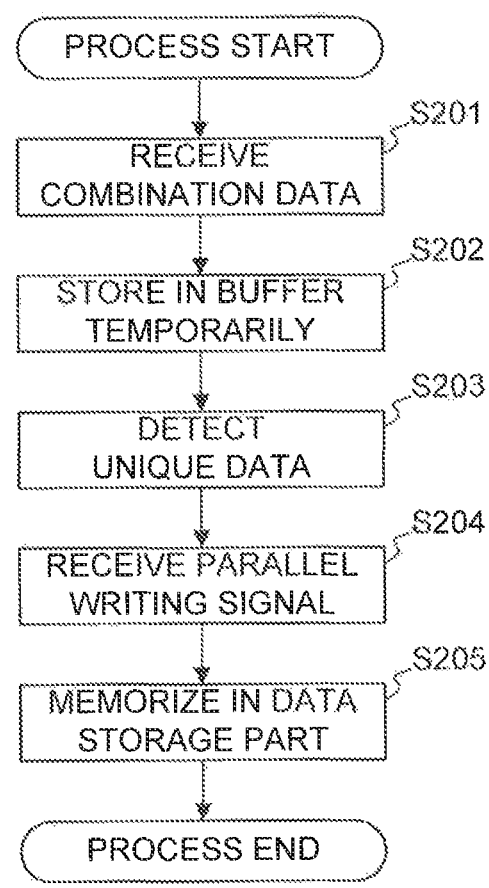
FIG. 6 is a flow chart showing a data storage process in the memory device of the first embodiment.

Then, the data storage process which performed by each of the memory devices 20-1 to 20-n is described below referring to a flow chart illustrated in FIG. 6.

The interface part 23 of the memory devices 20-1 to 20-n receives the combination data CD (step S201). The buffer 24 stores the received combination data CD temporarily (step S202).

The CPU 26 of the memory devices 20-1 to 20-n detects the unique data corresponding to the unique ID of the memory devices (i.e. the unique ID memorized in the unique ID memory part 25) from the combination data CD stored in the buffer 24 (step S203).

The interface part 23 receives the parallel writing signal PWS (step S204). The writing circuit 27 stores the unique data detected in the step S203 in the unique data storage part 29 of the flash memory 22 in response to the parallel writing signal PWS (step S205).

The writing unique data in the memory devices 20-1 to 20-n is completed by the above-mentioned steps.

It is therefore in the data writing system 100 of the present embodiment, the combination data CD is sent to the memory devices 20-1 to 20-n in parallel. Each of the memory devices performs detection and storage of the unique data corresponding to that each memory device.

A comparative example which is different from the data writing system 100 in the present embodiment is described below referring to FIG. 7 and FIG. 8. In the comparative example, the writing device 10 does not send the combination data CD and performs writing by sending merely the unique data corresponding to each memory device.

Figure 7:
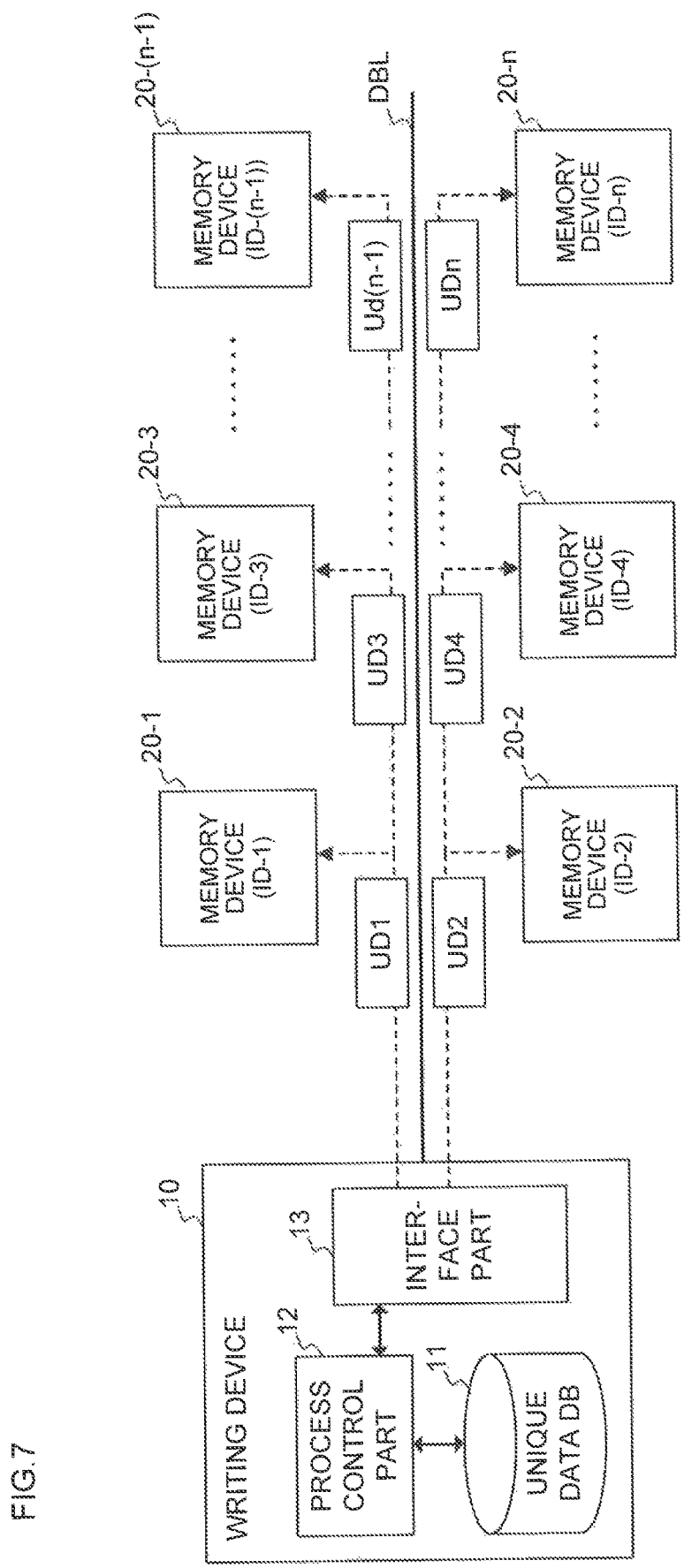
FIG. 7 is a schematic diagram showing transmission of the unique data in a comparative example.

As shown in FIG. 7, in the data writing system of the comparative example, the writing device 10 sends only the unique data (UD-1 to UD-n) specific to each memory device to the memory devices 20-1 to 20-n. In other words, the writing device 10 sends the unique data UD1 to the memory device 20-1, the unique data UD2 to the memory device 20-2, the unique data UD3 to the memory device 20-3, the unique data UD4 to the memory device 20-4, the unique data UD(n−1) to the memory device 20-(n−1), and the unique data UDn to the memory device 20-n respectively.

Figure 8:
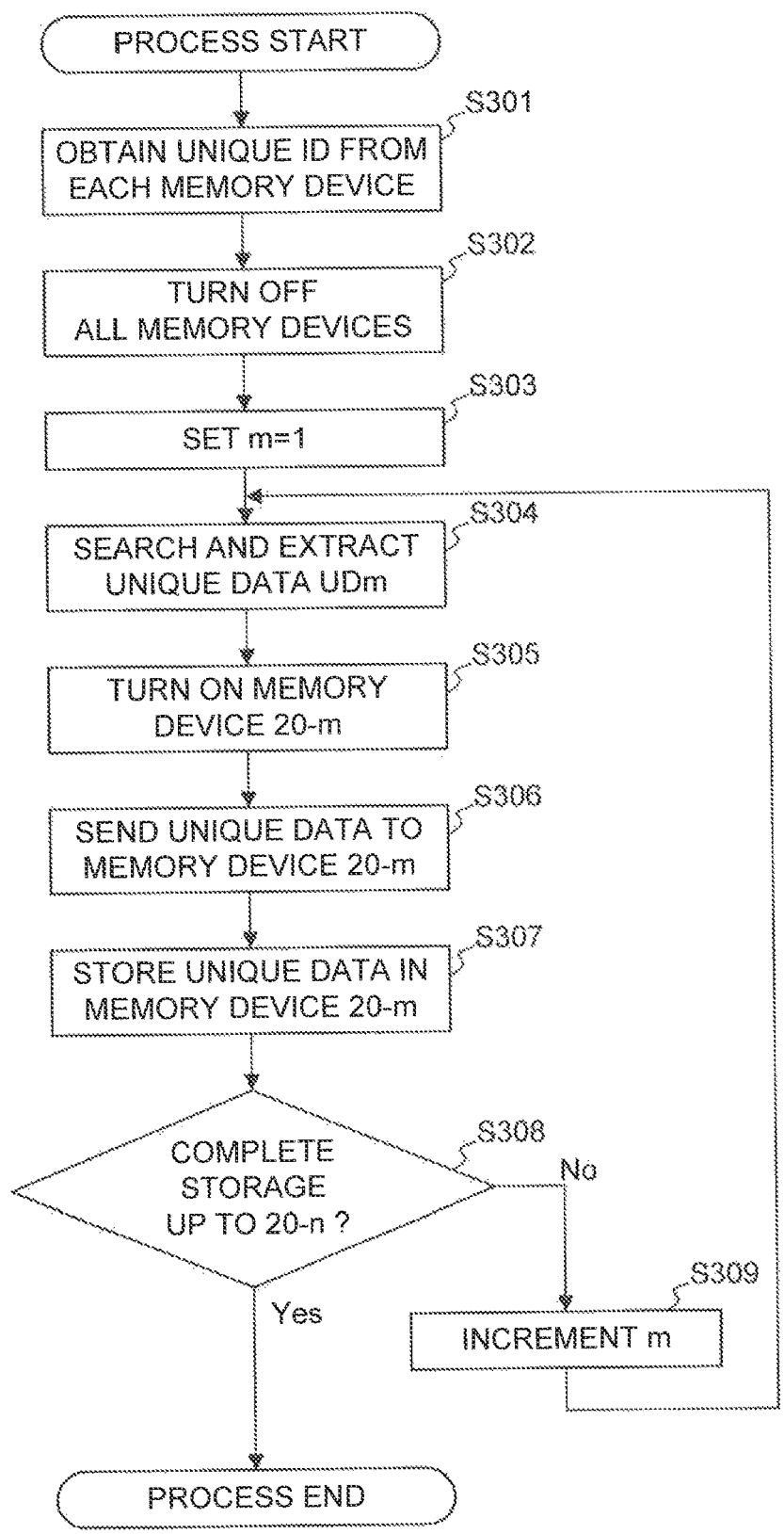
FIG. 8 is a flow chart showing a process of a data writing process in the comparative example.

FIG. 8 is a flow chart showing a process operation of a data writing process in the data writing system of the comparative example.

At first, the interface part 13 in the writing device 10 receives the unique ID from memory devices 20-1 to 20-n through the data bus line DBL. The process control part 12 obtains the unique data UD1 to UDn of the memory devices (step S301).

Next, all of the memory devices 20-1 to 20-n are turned off temporarily by stopping power supply to the memory devices 20-1 to 20-n from external power source (not shown) provided out of the data writing system (step S302).

The process control part 12 sets an m value indicative of the memory device which is writing destination of the unique data (i.e. memory device 20-m) to m=1 (step S303).

The process control part 12 searches and extracts the unique data UDm corresponding to ID-m which is the unique ID of the memory device 20-m from the unique data DB 11 (step S304).

The memory device 20-m is turned on by restarting the power supply from the external power source to the memory device 20-m (step S305).

The interface part 13 sends the unique data UDm to the memory device 20-m in response to the control by the process control part 12 (step S306).

The memory device 20-m stores the unique data UDm in its memory (step S307).

The process control part 12 of the writing device 10 determines whether the storing of the unique data is completed up to the memory device 20-n or not (i.e. m=n or not) (step S308).

When the process control part 12 determines that the storing of the unique data is not completed (step S308: No), the process control part 12 increments the value m by one and returns to the step S304 (step S309). The storing the unique data into the memory devices 20-1 to 20-n is completed by repeating the step S304 to S309 until m=n (m becomes equal to n).

In the data writing system of the comparative example, the writing of the unique data to the memory devices 20-1 to 20-n is completed through above-mentioned steps.

In the data writing process of the comparative example, processes of the above steps S304-S309 are repeated. A set of process constituted by (1) turning ON of the memory device which is a writing destination, (2) sending the unique data, and (3) storing the unique data to the memory device are performed n times corresponding to the number of the memory devices repeatedly.

Figure 5:
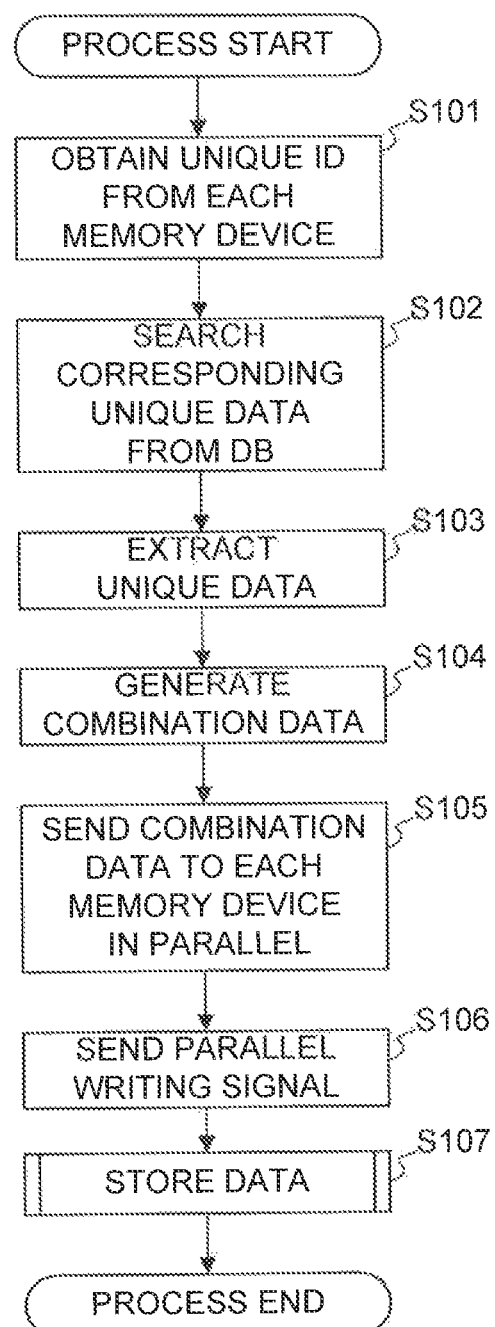
FIG. 5 is a flow chart showing a process of a data writing process in the first embodiment.

On the other hand, the combination data CD is sent to each memory device in parallel in the data writing process of the present embodiment as described referring to FIG. 5. It is not necessary to send data in a serial manner repeatedly in contrast to the comparative embodiment. Accordingly, length of time to send data is not increased in total although size of the combination data CD is larger than that of the individual unique data. In the present embodiment, a set of process is performed in a state that all of the memory devices 20-1 to 20-n are turned on. It is not necessary to turn on each of the memory devices in each process. In the present embodiment, storing the unique data to each of the memory devices is performed in parallel in response to the parallel writing signal PWS. It is not necessary to perform storing the unique data to each of the memory devices in a serial manner repeatedly as the comparative example.

In the data writing system of the present embodiment, required time to turn on the memory device and to store the unique data in the memory device is reduced so that writing unique data into the plurality of the memory devices in short process time becomes possible.

Second Embodiment

Figure 9:
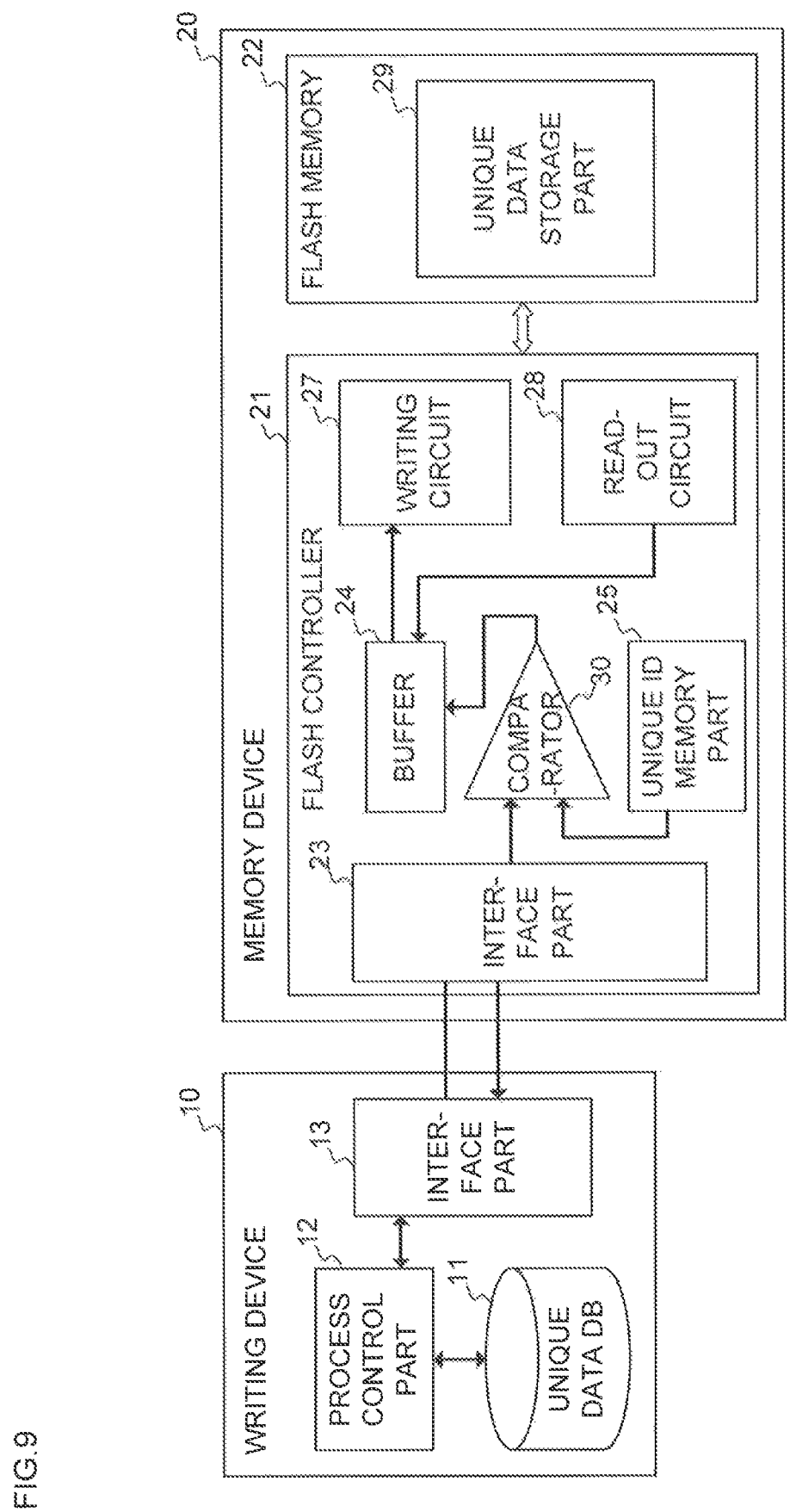
FIG. 9 is a block diagram showing a configuration of a writing device and a memory device of a second embodiment.
Figure 10:
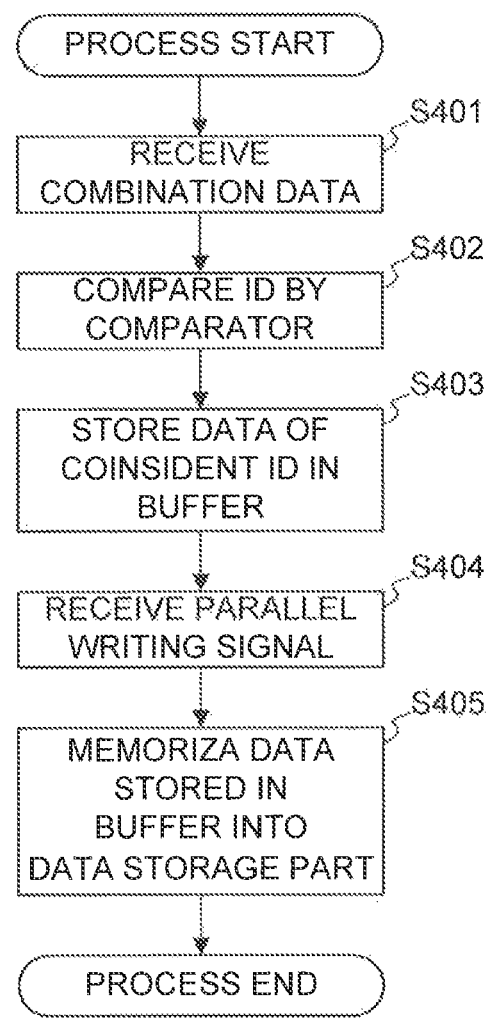
FIG. 10 is a flow chart showing a data storage process in the memory device of the second embodiment.

FIG. 9 is a block diagram showing a configuration of a writing device 10 and one of the memory devices 20-1 to 20-n (hereinafter referred to as memory device 20) included in a data writing system which is an embodiment of the present invention.

The writing device 10 comprises a unique data DB 11, a process control part 12 and an interface part 13. Configuration and operation of these elements of the writing devices 10 are equivalent to the corresponding elements appearing in the first embodiment.

The memory device 20 comprises a flash controller 21 and a flash memory 22. The flash controller 21 includes an interface part 23, a buffer 24, a unique ID memory part 25, a writing circuit 27 and a read out circuit 28. The memory device 20 has a comparator 30.

The comparator 30 compares the unique ID memorized in the unique ID memory part 25 and the unique ID included in the combination data CD (i.e. combination ID received by the interface part 23) which is sent from the writing device 10. When the unique IDs coincide with each other, the comparator 30 extracts unique data corresponding to that unique ID from the combination data CD and stores the unique data in the buffer 24.

Data storage process performed by the memory device 20 in the data writing process of the present embodiment is described referring to FIG. 5 In the data writing process of the present embodiment, the steps before the data storage process are in the same manner as the process in the first embodiment as shown in FIG. 5.

The interface part 23 of the memory device 20 receives the combination data CD (step S401).

The comparator 30 reads out the unique ID from the unique ID memory part 25 and compares that unique ID with the unique ID included in the combination data CD (step S402).

When there is any unique ID which coincide with the read out unique ID as a result of the comparison, the comparator 30 extracts the unique data corresponding to that unique ID from the combination data CD and stores the unique data in the buffer 24 (step S403).

The interface part 23 receives the parallel writing signal PWS (step S404). The writing circuit 27 reads out the unique data stored in the buffer 24 and stores the unique data in the unique data storage part 29 of the flash memory 22 in response to the parallel writing signal PWS (step S405).

The writing of the unique data in the present embodiment is completed by the above steps.

In the data writing system in the present embodiment, the memory device 20 performs the process in a state that all of the memory devices 20-1 to 20-n are turned on. Storing of the unique data into each memory device is performed in parallel. It is therefore the required time to turn on the memory devices and to store the unique data into the memory device is reduced. It becomes possible to perform writing of the unique data into a plurality of memory devices in shorter process time.

In the data writing system in the present embodiment, the memory device 20 stores only the unique data corresponding to the unique ID which coincides with its own unique ID (i.e. the unique ID memorized in the unique ID memory part 25) into the buffer 24. Data amount of the data stored in the buffer 24 can be reduced in comparison to a case that the combination data CD is stored in the buffer 24. Therefore, the buffer size can be reduced.

The present invention is not limited to the above-mentioned embodiments. For example, in the above embodiments, the memory device includes the flash memory as a memory which memorizes data. However, type of the memory is not limited to the flash memory. It is merely required that the memory device includes a nonvolatile memory.

In the above embodiment, it is explained that the unique data is searched from the combination data CD under the condition of coincidence of the unique ID as an example. Error detecting code such as CRC (Cyclic Redundancy Check), or error correction code such as ECC may be added to the unique ID. The unique data may be identified under the condition of coincidence of the unique ID and the code. According to such configuration, for example, it is possible to identify the unique data with a high degree of accuracy although in case error can be arisen in selected data (e.g. duplicated data between semiconductor memory devices) searched by only unique ID when the inputted unique ID is changed into garbled bits by noise.

It is understood that the foregoing description and accompanying drawings set forth the preferred embodiments of the present invention at the present time. Various modifications, additions and alternative designs will, of course, become apparent to those skilled in the art in light of the foregoing teachings without departing from the spirit and scope of the disclosed invention. Thus, it should be appreciated that the present invention is not limited to the disclosed Examples but may be practiced within the full scope of the appended claims. This application is based upon and claims the benefit of priority from the prior Japanese Patent Application No. 2017-229044 filed on Nov. 29, 2017, the entire contents of which are incorporated herein by reference.

What is claimed is:

1. A method for writing data performed by a data writing system constituted by a plurality of memory devices and a writing device which writes data into said plurality of memory devices comprising:
    data maintaining step at said writing device, for maintaining writing object data to each of said plurality of memory devices;
    obtaining step at said writing device, for obtaining identification information assigned to each of said plurality of memory devices from said plurality of memory devices;
    generating step at said writing device, for generating combination data by associating and combining said identification information and said writing object data with respect to said plurality of memory devices;
    sending step at said writing device, for sending said combination data to said plurality of memory devices;
    receiving step at each of said plurality of memory devices, for receiving said combination data;
    extracting step at each of said plurality of memory devices, for extracting said writing object data corresponding to the memory device on the basis of said identification information from said combination data; and
    memorizing step at each of said plurality of memory devices, for memorizing said target data for writing extracted from said combination data.

2. The method for writing data according to claim 1 further comprising:
    sending step at said writing device, for sending a writing signal to said plurality of memory devices wherein said writing signal indicates to write said writing object data into said plurality of memory devices in parallel; and
    receiving step at each of said plurality of the memory devices, for receiving said writing signal, wherein
    said memorizing step for memorizing said target data for writing extracted from said combination data, each of said plurality of memory devices memorizes said writing object data in response to said writing signal.

3. The method for writing data according to claim 1 further comprising:
    storing step at each of said plurality of memory devices, for storing said combination data in a buffer temporarily,
    in said extracting step for extracting said writing object data corresponding to the memory device from said combination data on the basis of said identification information, each of said plurality of memory devices extracts said writing object data from said combination data stored in said buffer.

4. The method for writing data according to claim 1 wherein the extracting step at each of said plurality of memory devices for extracting said writing object data corresponding to the memory device from said combination data on the basis of said identification information including:

comparing step at each of said plurality of memory devices, for comparing said identification information of the memory device and a plurality of said identification information included in said combination data;

extracting step at each of said plurality of memory devices, for extracting said writing object data corresponding to identification information which coincides with said identification information of the memory device from a plurality of said writing object data included in said combination data on the basis of a result of the comparison; and storing step at each of said plurality of memory devices, for storing said writing object data in a buffer temporarily.

5. A memory device which memorizes data comprising:
an identification information memorizing part that stores an identification information assigned to said memory device;
a nonvolatile memory;
a writing circuit configured to write data in said nonvolatile memory;
a buffer configured to store said writing object data temporarily;
a receiving part configured to receive a combination data which is obtained by associating and combining identification information with respect to a plurality of memory devices and writing object data, and a writing signal which indicates writing of data into said nonvolatile memory; and a comparing part configured to compare said identification information memorized in said identification information memorizing part and identification information with respect to said plurality of memory devices included in said combination data; wherein said comparing part extracts writing object data corresponding to said memory device from said combination data on the basis of a result of the comparison, said buffer stores temporarily said writing object data extracted by said comparing part, said writing circuit writes said writing object data which is read out from said buffer into said nonvolatile memory in response to said writing signal.

6. A data writing system constituted by a plurality of memory devices and a writing device which writes data into said plurality of memory devices wherein
said writing device includes:
data maintaining means for maintaining writing object data corresponding to each of said plurality of memory devices;
obtaining means for obtaining identification information assigned to each of said plurality of memory devices from said plurality of memory devices;
generating means for generating combination data by associating and combining said identification information and said writing object data with respect to said plurality of memory devices; and
sending means for sending said combination data to said plurality of memory devices,
each of said plurality of memory devices includes:
receiving means for receiving said combination data;
extracting means for extracting said writing object data corresponding to the memory device on the basis of said identification information from said combination data; and
memorizing means for memorizing said target data for writing extracted from said combination data.

* * * * *